(12) United States Patent
Brackett et al.

(10) Patent No.: US 10,942,629 B1
(45) Date of Patent: Mar. 9, 2021

(54) RECALL PROBABILITY BASED DATA STORAGE AND RETRIEVAL

(71) Applicant: Laitek, Inc., Homewood, IL (US)

(72) Inventors: Cameron Brackett, Homewood, IL (US); Barry Brown, Homewood, IL (US); Razvan Costea-Barlutiu, Homewood, IL (US)

(73) Assignee: Laitek, Inc., Homewood, IL (US)

( * ) Notice: Subject to any disclaimer, the term of this patent is extended or adjusted under 35 U.S.C. 154(b) by 0 days.

(21) Appl. No.: 17/072,357

(22) Filed: Oct. 16, 2020

(51) Int. Cl.
| | | |
|---|---|---|
| *G06F 15/16* | (2006.01) | |
| *G06F 3/0482* | (2013.01) | |
| *H04L 29/08* | (2006.01) | |
| *G06F 12/122* | (2016.01) | |
| *G06F 16/248* | (2019.01) | |

(52) U.S. Cl.
CPC .......... *G06F 3/0482* (2013.01); *G06F 12/122* (2013.01); *G06F 16/248* (2019.01); *H04L 67/1097* (2013.01)

(58) Field of Classification Search
CPC .... G06F 3/0482; G06F 16/248; G06F 12/122; H04L 67/1097
USPC .......... 709/220, 224, 226, 227, 228
See application file for complete search history.

(56) References Cited

U.S. PATENT DOCUMENTS

| | | | | |
|---|---|---|---|---|
| 6,742,084 | B1 * | 5/2004 | Defouw | G06F 12/122 711/133 |
| 7,882,366 | B2 * | 2/2011 | Sen | G06Q 10/06 713/193 |
| 8,849,761 | B2 * | 9/2014 | Prahlad | G06F 16/41 707/640 |
| 9,753,455 | B2 * | 9/2017 | Drees | G05B 23/0229 |
| 10,671,951 | B2 * | 6/2020 | Shrimali | G06Q 10/06315 |
| 2008/0256110 | A1 * | 10/2008 | Sen | G06Q 10/06 |
| 2016/0078045 | A1 * | 3/2016 | Ebsen | G06F 16/1744 707/693 |
| 2016/0337226 | A1 * | 11/2016 | Padala | G06N 20/00 |
| 2017/0270449 | A1 * | 9/2017 | Shrimali | G06F 8/00 |
| 2019/0182059 | A1 * | 6/2019 | Abdou | H04L 12/18 |
| 2019/0286074 | A1 * | 9/2019 | Hoffmann | G06K 9/00536 |

* cited by examiner

*Primary Examiner* — Khanh Q Dinh
(74) *Attorney, Agent, or Firm* — Bekiares Eliezer LLP

(57) ABSTRACT

The present disclosure provides methods, computer readable media, and a system (the "platform") for recall probability-based data storage and retrieval. The platform may comprise a hierarchical data storage architecture having at least one of the following storage tiers: a first tier, and a second tier; at least one computing agent, wherein the at least one computing agent is configured to: compute a recall probability for a data element stored in the data storage, and effect a transfer of the data element based on, at least in part, the recall probability, wherein the transfer of the data element is between at least the following: the first tier, and the second tier; and a graphical user interface (GUI) comprising at least one functional GUI element configured to: enable an end-user to specific a desired balance between at least one of the following elements: speed of data retrieval, and cost of data storage.

18 Claims, 12 Drawing Sheets

RECALL PROBABILITY BASED DATA STORAGE AND RETRIEVAL

FIELD OF INVENTION

The present invention relates to storing and retrieving data, and more specifically, to storing and retrieving data from a hierarchical data storage system.

BACKGROUND

Hierarchical storage management (HSM) is a data storage technique that exists to, as one example, mitigate operational cost and increase operational efficiency. Costs and efficiencies may be optimized based on where in such hierarchical arrangement data is stored. For instance, the costs of high-speed storage devices, such as solid-state drive arrays, are higher (per byte stored) than slower devices, such as hard disk drives, optical discs and magnetic tape drives.

HSM is a long-established concept, dating back to the beginnings of commercial data processing. The techniques used though have changed significantly as new technology becomes available, for both storage and for long-distance communication of large data sets. The scale of measures such as 'size' and 'access time' have changed dramatically, and the operational efficiencies of the various storage device types, used in a networked environment vary.

While it would be ideal to have all data available on high-speed devices all the time, this may not always be feasible to many organizations. For one, high-speed device storage may be prohibitively expensive for many organizations. Instead, HSM systems store the bulk of the enterprise's data on slower devices, and then copy data to faster disk drives when needed.

In various industries, such as, for example, healthcare information technology (IT), the use of cloud storage may be more economical than owning and maintaining local storage since an organization using such a system may reduce hardware, software, and labor costs. One challenge in cloud systems is enabling cost-effective use of various cloud storage tiers having various access speeds while maintaining a reduced access time to needed data.

Cloud vendors market to users with various ways of storing massive amounts of data in the cloud, offering a tiered storage system, with different storage costs per each tier, with costs of recalling the data and so on. The cloud technology becomes accepted and embraced in many areas, including healthcare users that deal on a daily basis with large amounts of health-critical data, such as, for example, medical imaging.

The pricing models are consistent among many cloud storage vendors, with slight variability. The pricing models are built by tying the data storage cost to the speed of accessing that data, following the principle of "fast access, higher cost of storage-slow access, lower cost of storage". This allows users to obtain cost savings at the expense of overall system performance (e.g., store only what's needed into fast, expensive" storage, store everything else in slower, cheaper" storage).

While cost control of cloud storage is a problem receiving increased attention and some solutions exist on the market, some solutions are technical in nature and geared to highly sophisticated, savvy engineering-type folks. These solutions tend to split the cost control into components, allowing the users to finely tune the systems parameters. This typically turn such cost control systems into difficult-to-use gadgets, out of the reach of decision makers which will find themselves stuck when trying to model their institution spending, being dependent on storage administrators, slowing down the modeling and decision process. As one potential consequence, miscommunication may arise between the technical individuals who are responsible for network controls and non-technical individuals who are accountable for institutional objectives tied to those network controls.

In turn, organizational leaders are routinely faced with the challenge of managing their operational cost to network efficiency and are reliant on front line skill sets. Often the CFO sets the financial constraints upon the organization, and imposes them on other executives, such as the CIO and/or CTO. Continuing with this example, the CIO or CTO may further pass down those constraints to IT staff to find the best value out of their IT infrastructure to meet the constraints and the demands of the organization.

Moreover, traditional HSM systems are not typically accessible to non-technical users; yet, non-technical users may be tasked with responsibilities that require highly technical modifications to be made to such systems to meet their needs. Accordingly, there is a need to enable non-technical users to leverage network operations of their organization in an easy and dynamic solution, that caters to their changing needs and simplify network system complexities to empower less technically oriented people to manage their costs relative to technological efficiencies.

These systems are not dynamic or adjustable on-demand, and often pre-configured based on, for example, certain parameters and attributes set on a highly technical level. Moreover, these systems are not configured to project future organizational needs; but, rather, are designed to be reactive and back-ward looking.

It should be further understood that similar problems persist across all industries, and this disclosure is not limited to the healthcare industry.

Thus, there is a need across various industries for methods and systems that improves the intelligence of conventional HSM techniques and enables non-technical users to impact operational costs while improving network performance.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure provides methods, computer readable media, and a system (the "platform") for recall probability-based data storage and retrieval. The platform may comprise a hierarchical data storage architecture having at least one of the following storage tiers: a first tier, and a second tier; at least one computing agent, wherein the at least one computing agent is configured to: compute a recall probability for a data element stored in the data storage, and effect a transfer of the data element based on, at least in part, the recall probability, wherein the transfer of the data element is between at least the following: the first tier, and the second tier; and a graphical user interface (GUI) comprising at least one functional GUI element configured to: enable an end-user to specific a desired balance between at least one of the following elements: speed of data retrieval, and cost of data storage.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1A:
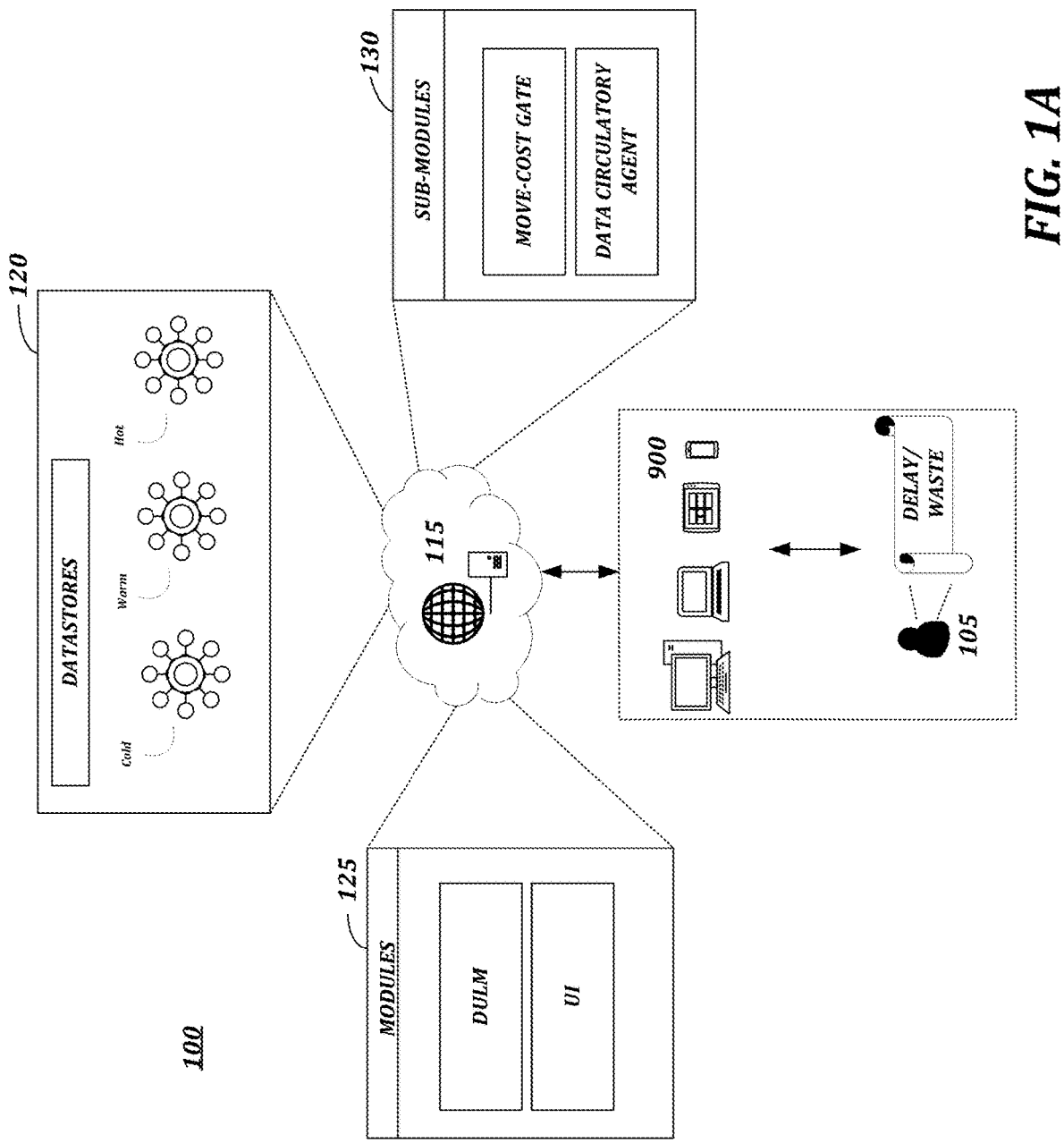
FIG. 1A illustrates a block diagram of an example embodiment of a data system.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of data storage in, for example, the medical industry, embodiments of the present disclosure are not limited to use only in this context. For example, embodiments disclosed herein may be applicable to a domain's data set, wherein the data set has, but is not limited to, any one or more of the following characteristics:

The data set is composed of many discrete objects, each of which can be assigned their own short-term recall probability;

Enough of the objects will have a low enough probability of recall that they can be put into slow-tier storage without affecting the operational use of the entire data set, and that produces a meaning cost savings;

There are available object attributes that can be correlated with recall patterns to generate a reasonably good prediction of future recall events;

Recall events are generally infrequent, so object attributes are used to predict future recall events. This is different from other multi-tier methods that simply use recent-past recall events to predict future recall events; and Data types that may be associated with, but not limited to, any one or more of the following:
  a. Medical data,
  b. Scientific data,
  c. Genomic data,
  d. Weather data,
  e. Financial data,
  f. Geological data,
  g. Gas and oil exploration data,
  h. Astronomy data,
  i. Defense and intelligence data,
  j. Law enforcement data,
  k. Satellite imaging data,
  l. Personal photos and videos,
  m. News archives,
  n. Video and music archives,
  o. Social media archives, and
  p. File archives and backups.

Other examples in which embodiments of the present disclose may apply include the entertainment industry wherein videos (e.g., YouTube) or movies (e.g., Amazon) may stratify the management and storing of such items based on movie, type of movie, popularity of movie, region, and other parameters.

Furthermore, embodiments of the present disclosure could apply to oil and gas exploration wherein older images are managed and stored based on age, region, cost to develop that region, and other parameters.

Still consistent with the spirit and scope of the present disclosure, embodiments may apply to the music entertainment (e.g., Spotify, Apple music, etc.) similar to the video entertainment. Music may be stratified on varying degrees based on type, popularity, region, and other parameters.

In yet further embodiments, the storage of application data, whether locally on a computing device, or in remote storage, may be governed based on the same principles with the spirit and scope of the present disclosure. For example, a mobile operating system service may monitor applications and other data, such as photos, to determine where the best suited storage location of such data would be. The locations may be changed or updated based on the systems determination when to relocate the files based on, for example, recent usage and/or anticipated usage based on a plurality of parameters.

It could be further contemplated that the various embodiments herein may apply to data storage, in general. For example, business IT, in the general sense, may apply the various embodiments herein to systems to tune their cost to quality—even turning the system towards cold storage more than normal to save more IT costs. For instance, storage decisions may be based on object age, access, person (e.g., CEO, CFO, engineer, admin, etc.) who created the object, department (e.g., marketing, service, etc.) that created the object of data to be stored (e.g., email, word docs, pictures, presentations, and the like). As discussed above, many organizations that maintain computer systems also own and maintain the data storage systems that store and retrieve data for the system users. Organizations may employ HSM systems that include fast-access storage, that is more expensive to maintain, and cold-access storage, that may be less expensive to maintain. These systems may include a mix of on-premises and remote storage locations, including, but not limited to, a cloud system that is owned and maintained by a third party.

Indeed, many organizations have found that using a cloud or cloud-type system for storing their data reduces their data storage costs while providing adequate data retrieval and storage operations to meet the demands of the users in the organization. However, in practice, there are some organizations that store and retrieve particularly large files or large sets of files used in a single transaction (e.g., CT and MR imaging studies often include thousands of 500 kb files, which can result in a single study consuming several gigabits of storage space) that are challenging to retrieve from a remote storage systems, such as, for example, but not limited to, a cloud storage system, in a timely and cost-effective manner.

Storage, such as HSM systems or other cloud storage systems, may also offer different cost tiers of service with different types of service arrangements for the tiers. For example, a cloud storage system may offer a more expensive first tier of service where data may be stored and retrieved quickly by users without additional fees. Such a service may also offer a second tier of service that is less expensive than the first tier, but charges additional fees to retrieve the data in the second tier. Such a second tier is often used for data that will not be retrieved often by a user.

Medical data systems, for example, offer many administrative and technical challenges. Medical data such as, for example, computed tomography (CT) scan images, magnetic resonance imaging (MRI) images, x-ray images, and others medical related data (e.g., including imaging studies) may result in very large data files or file sets that are costly to store. Such images are often retrieved by users to aid in the care of a patient. Since the full set of images for a patient can get large, the retrieval of the image files from a slower remote data storage location may take an unacceptably long time for the user such as, for example, over twenty seconds. Many users of such a system expect a requested data file to be retrieved in a shorter time such as, for example, less than two seconds in order to provide efficient care to their patients.

Organizations often struggle to find a balance between storing data files on a system administered by the organization. The system may be any one or more of on-premises and off-premises solutions. On-premises solutions may often be relatively expensive (e.g., purchased hardware/software and IT staffing), but usually offer fast data retrieval. Off-premises storage of data (e.g., in a remote or cloud based data storage system), in some cases, is less expensive, but may incur a slower data retrieval rate or additional fees for retrieving files in particular cost tiers.

One challenge of storing a portion of organizational data in a relatively expensive storage location with fast retrieval times and another portion of the organizational data in a relatively less expensive storage location with longer data retrieval times is determining which data should be stored in which location. This determination may improve, maintain, or adjust the performance of the system while reducing or maintaining the economic cost of the system.

Another challenge for administering such a system is providing a user interface and method to allow a user to easily "tune" the data storage arrangement to, for example, increase or decrease the amount of data that is stored in a storage tier with faster retrieval versus the amount of data stored in a storage tier with slower (or less expensive) retrieval times.

Such a user interface allows an administrator to conveniently adjust parameters of the system such as where data is stored with respect to the cost of storage, thereby adjusting the performance (e.g., data retrieval time) and costs of operating the system without being particularly skilled at information technology tasks.

The user interface allows the user to adjust parameters and trade off how often or long a user will wait for data under a given threshold of time (e.g., <2 s). The system allows for the controller on the UI to be set at the users desired levels. For example, the user may be able to increase performance, but the cost must also increase. The platform can minimize the increased costs by only moving the more likely retrieved objects to the more expensive storage. Furthermore, the user can reduce the cost while the platform minimizes the negative impact to the overall performance. Embodiments of the present disclosure may improve the performance of a network system. Improving the performance of the network system that stores and transmits the data may provide a plurality of practical and technical advantages. The practical advantages may comprise, but not be limited to, shorter user wait times and decreasing the IT costs of the organization. It should be understood that the term 'costs', as used in the present disclosure, may implicate both economic and technical costs. For example, the technical advantages may comprise, but not be limited to:

Increased breadth of users enabled to control the network function, thereby leading to lower-overhead costs to maintain the network;
Decreased bandwidth consumption and increased overall network quality of service by decongesting the network;
Faster file retrieval without extraneous resource utilization to maintain more than necessary hot-storage;
Decreased storage and power consumption without maintaining too many resources in cold-storage;
Decrease waiting times for data to be transferred to the data-usage points (e.g., a radiologist's workstation);
Consequential faster load times of files on a computing device part of a network system implementing one or more of the various embodiments herein;
Improved resource allocation for better on-demand delivery; and
Increased network efficiency during peak times.

Technical advantages further include an enablement of data usage projections and subsequent resource allocation in response thereto. In this way, data that is projected to be of likely utilization may be transferred to network points that are most accessible to users. This, in turn, helps to mitigate bandwidth saturation. For instance, embodiments disclosed herein may allow medical data to be brought from the cloud to hospitals in a timely fashion, during off hours over multiple days, avoiding saturating the link between the hospital and the cloud and thus impacting clinical operations. This may be achieved, by way of non-limiting example, the transfer of objects with a higher recall probability into higher performance storage tiers before the objects are recalled.

It should be further understood that the technical advantages may be further derived from increased usability by a breadth of non-technical users, thereby leading to additional network users who have an impact on network functionality, but without the requisite technical skills that serve.

Consistent with embodiments of the present disclosure, the figures and descriptions disclosed herein offer a data storage system that uses a variety of object data and metadata to determine whether to store data in, for example, a more costly and sometimes local storage system tier with relatively fast data retrieval, or in a particular tier of a remote cloud based data storage system that offers less costly storage and often, relatively slower retrieval of the data.

Still consistent with embodiments of the present disclosure, the figures and descriptions offer a user interface that presents a user (e.g., a system administrator or leader in the organization) with simple controls or procedures to allow the user to "tune" or adjust the type of data stored in particular locations (i.e., cost tiers) with respect to target monetary cost and performance (e.g., data retrieval time) desired by the user. Such a system also provides the user with cost estimates for a data storage arrangement (setting) when the user enters an adjustment to the type and character of the data stored in more expensive storage with fast data retrieval times versus data stored in relatively less expensive cost tiers with slower data retrieval times such as, for example, a cloud based data storage system.

Consistent with yet further embodiments of the present disclosure, the figures and descriptions offer a user interface that allows a user to set a financial goal (i.e., how much the system operation would cost) and receive feedback regarding the projected system performance with the new settings as well as financial delta information (i.e., how much more or less the system would cost in the new setting vs the current setting). When the desired financial goal is reached, the underlying algorithms will take the parameters set by the user and proceed towards moving data between various cost tiers so that the goal set by the user is met.

Accordingly, embodiments provide various functions, controls, and user interface elements that allow users, such as, for example, but not limited to, personnel responsible for managing an IT budget and serving the IT platform, to update thresholds using, in some embodiments, a single control presented on a user interface. Said functions, controls, and user interface elements may, in turn, improve the operation of the system in a networked environment.

Non-technical or untrained users may configure their storage systems in such a way that they can achieve financial operational targets (e.g., reduction in storage system cost by X % over the next 12 months) by controlling a simple control, with values ranging from "slower" to "faster". The control will further indicate, in real time, the projected system cost in the next configurable interval and how does that compare to the current settings.

Furthermore, based on the settings of the controls, the system may intelligently set or recommend policies on the data it manages such that the projected costs, improvements and network efficiency are achieved. This piece is done through the use of algorithms, heuristics and AI which will determine the recall probability of individual objects in the storage system. As will be detailed below, the recall probability may be calculated based on a plurality of factors. By way of non-limiting example, some factors may be based on the properties of the object in the storage system; other factors may be based on properties of the network facilitating at least a portion of the storage system; while still other factors may be based on external factors (e.g., external data outside of the network). Together, and with additional factors, embodiments of the present disclosure may be used to project a probability that the object may be recalled at a future time.

As on illustrative example, in projecting a recall probability, methods and systems disclosed herein may consider, for example, a physician's upcoming patient schedule (e.g., an immunologist), particular traits of the patients in the schedule (e.g., environmental allergies of the patient), an upcoming pollen count (e.g., an external dataset), similar activities during the treatment of like patients by other physicians (e.g., common studies recalled), as well as projected network congestion and costs. Using these parameters, and others, embodiments of the present disclosure may adjust the recall probability of certain objects (e.g., increase the recall probability of certain data that relate to the patient, related studies, and any other data that may be useful to the physician and other interested parties to quickly retrieve at the appropriate time). In some embodiments, patient check-in and/or patient cancelations/rescheduling may further impact the recall probability of the corresponding objects. Continuing with the aforementioned example, after the patient has been treated and checked-out, the recall probability may be recalculated (e.g., decreased so as to enable the correspond objects to be de-prioritized in accordance to satisfy the constraints imposed by the user setting or maintained/even increased if the condition is known to generate a requirement for a follow-up visit in the immediate interval).

Accordingly, using this projected probability, in conjunction with a user setting depicting their target costs and efficiency, methods and systems may be employed to transfer the object to an optimal storage tier to optimize the network's readiness to serve the interested parties' needs, while meeting the constraints of the organizational tolerance for the resultant increased costs.

The aforementioned user setting may be indicative of the user's tolerance for increased costs weighted against both business and network efficiencies. The user setting may be used to determine a threshold values of recall probability for each of a plurality of storage tiers. The threshold value may be used, in turn, to calculate an acceptable range of recall probability for each storage tier. In this way, embodiments of the present disclosure may then be used to determine where (e.g., a 'hot' storage tier or a 'cold' storage tier) to store an object (e.g., a file) in the networked storage system based on the object's calculated recall probability.

FIG. 1A illustrates one possible operating environment through which a platform consistent with embodiments of the present disclosure may be provided. By way of non-limiting example, a platform 100 may be hosted on, for example, a cloud computing service. In some embodiments, the platform 100 may be hosted on a computing device 900 (of FIG. 9). A user may access platform 100 through a software application and/or hardware device. The software application may be embodied as, for example, but not be limited to, a website, a web application, a desktop application, and a mobile application compatible with the computing device 900. One possible embodiment of the software application and/or hardware device may be provided by Laitek, Inc.

Embodiments of the present disclosure may be comprised of at least two modules 125. A data usage likelihood (DULM) module and a user interface (UI) module for working in conjunction with the DULM so as to provide an application of a recall probability rendered by the DULM. Accordingly, embodiments of the present disclosure may comprise methods, systems, and a computer readable medium comprising, but not limited to, at least one of the following:

A. DULM Module; and

B. UI Module.

In some embodiments, the present disclosure may provide an additional set of modules for further facilitating the software and hardware platform. The additional set of modules may comprise, but not be limited to:

C. Move-Cost Gate 130; and

D. Data Circulator Agent 130.

The modules above are communicative with the computer 900 via a network 115. The network 115 communicably connects the data stores 120 to the computer 900 for presentation to and control by the user 105.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of this specifications. Each component disclosed for one module may be mixed with the functionality of another module. In the present disclosure, each component can be claimed on its own and/or interchangeably with other components of other modules.

The following depicts an example of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device 900 may be employed in the performance of some or all of the stages disclosed with regard to the methods. Similarly, an apparatus may be employed in the performance of some or all of the stages of the methods. As such, the apparatus may comprise at least those architectural components as found in computing device 900.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, the DULM receives a variety of inputs to calculate a recall probability that may, in turn, be used to ensure that the quality of service meets a desired metric, such as, for example, a wait time for loading a file. In operation, the system is operative to retrieve data or metadata associated with the file or object. The data may include data relating to an entity associated with the data such as, for example in medical imaging, a patient's medical history, the clinic or physician, type of condition, medical practice area associated with condition, budget constraints, or study. The type of condition and the appointment or testing schedules of the patient may also be used to analyze and predict a temporal demand for the file by a user. Related patients may also be used to make determinations and to improve the standard of care to patients across multiple clinics or organizations. Another example would be in the realm of defense or law enforcement systems, geographical data or other intelligence data determined to be connected to a certain event. Such data can be assigned a higher likelihood of usage and brought from frozen to hot storage once the triggering event passes, ensuring optimal cost-to-performance ratio of the system.

The embodiments described herein include a prediction model that generates recall probability that may, for example, represent a projected probability that a data file will be retrieved within a particular time period. The recall probability may increase when a patient appointment approaches, while if a patent passes away, the recall probability may decrease.

Accordingly, the DULM may provide a proprietary algorithm, using heuristics and machine learning in order to determine the likelihood of data access based on a number of components described below. The algorithm may be specialized on the type of data being managed—in this case, medical imaging data and medical documents. The following parameters (but not limited to) may be aggregated by the DULM patient exam date, exam type, modality, procedure description, patient ID/name,—patient scheduling (e.g., studies for patients scheduled for a following day will automatically receive the highest possible recall type. The scoring for a patient that has been scheduled and the visit already occurred will lower and may trigger the study to be moved to a colder tier.

Consistent with embodiments of the present disclosure, there may be at least three processes involved in optimizing the storage. The first process may comprise calculating the recall probability of an object in the near short-term. This recall probability may then be used to determine which storage tier to use for the study. The second process may comprise the feedback to the prediction algorithm as objects are recalled (and not recalled) used to improve future recall probability calculations. The third process may comprise a determination, based on a user setting, as to which tier the object should be stored in for optimal network performance while meeting organizational constraints. These processes may be iterative and constantly running to maintain the optimal store based on the factors being analyzed. Furthermore, in various embodiments, multiple systems running networks that would not otherwise communicate with each other may share learned models for optimizing the recall probability calculations.

Still consistent with embodiments of the present disclosure, the DULM may be configured to calculate and provide a recall probability. The recall probability indicates which tier the study should be stored on. The recall probability computation may be triggered by the Data Circulator Agent on a regular basis (e.g., daily/weekly intervals), and ranges between 0 and 1. It should be understood that a different nomenclature, or scoring range, may be employed by the various embodiments disclosed herein without deviating from the spirit or scope of the present disclosure.

Some embodiments of the present disclosure may comprise a priority modifier. The priority modifier allows the recall probability to be biased, or otherwise modified, in cases, even if the recall probability is low, the priority modifier might push the study into fast storage. This parameter may be used in extraordinary cases which would break the learned data usage patterns and allows the users of the system to override default behaviors and maintain therefore a good usability of the system. For example, in medical imaging, for a patient that passed away, the priority modifier may push the study into frozen storage. Another similar example would be an emergency situation—e.g., an earthquake hitting an unexpected area which in a geological information management system might trigger recalling specific terrain data.

As will be detailed with reference to FIGS. 4A-C, embodiments of the present disclosure may provide a user interface. The user interface that may include, for example, a dial. The dial may be configured to adjust the threshold at which files are moved from cold to hot storage based on the file's recall probability. The adjustments to the dial may not change how the recall probability for the file is calculated. Rather, it adjusts the underlying system's decision as to where to store files based on their recall probability calculations.

Accordingly, the dial may be used to define the bias parameter which will be instructing the system on the preference of storing more or less data into the more expensive storage tiers. As the system yields a recall probability for each object, directly influenced by the object's recall probability, the user can manipulate the system, for instance, so that the more expensive storage tiers receive data having lower recall probability. In turn, the network may respond faster in a larger number of usage cases, including ones that are less frequent and which, having a lower recall probability, might be delegated to slower responding network segments. For instance, if the system is used to manage personal photos and videos, when the dial is configured towards "speed", the user might see the same recall times for a picture taken this year and an unrelated video taken 20 years ago. Furthermore, if the system's setting is geared towards "economical", recent videos will be accessed quickly whereas a video from last year might take longer to load. The UI will allow the user to simulate new settings, offering feedback with respect to cost savings or penalties, projected new distribution on storage tiers. When the dial is not being manipulated, the UI may be designed to offer a view of the current and past system's cost, distribution of data over storage tiers and usage statistics. In various embodiments, the UI may provide "feedback" to the user such as, for example, an indicator on the UI that indicates and provides a count when a data is recalled from a "warm", "cold", or "frozen" storage location. Furthermore, waste may also be indicated on the UI by determining how long a file is stored in a high-level recall tier without being used. If the data is placed at a high tier without being recalled by a user, the high level storage space is effectively wasted. Such waste may be determined based on, for example, whether a patient was discharged, did a physician recall the study, did physician review data during a follow up period or other period of time. The system may also take average of recalls over a particular time period to form other considerations.

When operating the user interface by, for example, turning the user input 406 (of FIG. 4A) the user receives feedback with respect to indicators such as, the data retrieval speed. This may, in turn, be extrapolated to be indicative of a volume of patients and the projected revenue based on the number of patients that a practice might be able to serve. Accordingly, improving the network efficiencies in the tiered data storage systems may directly impact the provision of services or products associated with the data.

Figure 1B:
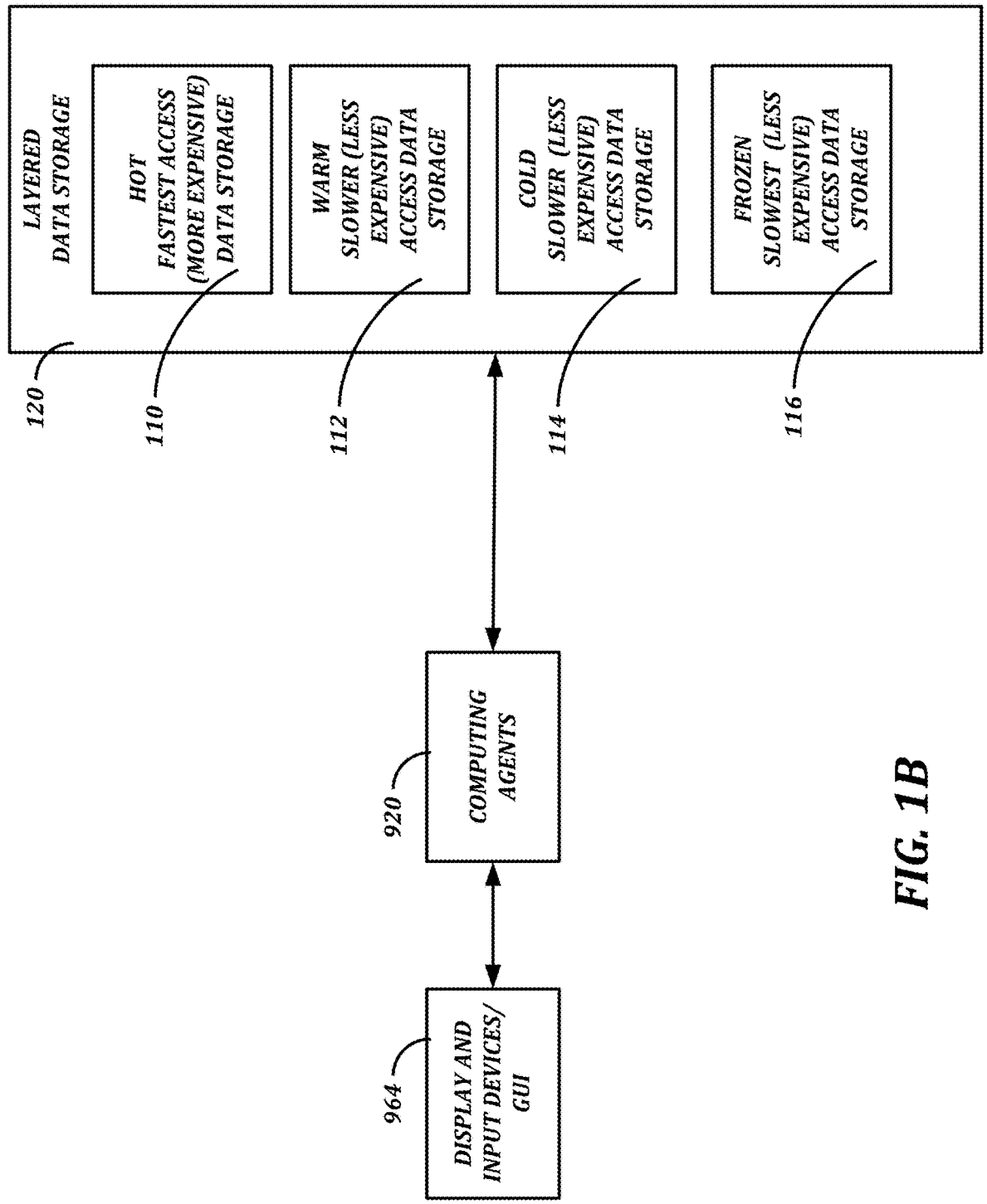
FIG. 1B illustrates a block diagram of an example embodiment of a data system.

In this regard, FIG. 1B illustrates a block diagram of an example embodiment of a data system. The system 900 includes a processor 920 that is communicatively connected to display and input devices 964, and a tiered data storage system 120.

The tiered data storage system 120 includes, in this example, a "hot" tier 110 that offers the fastest data retrieval for users at the most expensive cost. A "warm" tier 112 offers slower less costly data retrieval than the hot tier 110. The "cold" tier 114 provides slower data retrieval than the warm tier 112. The "frozen" tier 116 provides the relatively slowest data retrieval and lowest cost in the tiered data storage system. It should be understood that the tiers need not coincide with the location of the physical database, whether on-premises or off-premises.

The use of the terms "hot", "warm", "cold", "frozen" are merely used to illustrate the relative relationships between the cost tiers in the tiered data storage system 120 where the "hot" tier provides the fastest data retrieval time at the highest cost and the "frozen" tier provides the slowest data retrieval at the lowest cost. Though the data retrieval speeds and cost are used to describe the example embodiments herein, any performance metric of the system may be used to classify tiers in the system and the data stored in the tiers. The illustration of four tiers in the tiered data storage 120 is merely an illustration. The system 100 may include any number of tiered data storage systems and any number of tiers.

The example embodiments of the system 100 may include any number of processors and tiered data storage systems. Though in the illustrated example embodiment the tiered data storage 120 includes tiers that may be located in a remote location using, for example, a cloud computing scheme, in some embodiments the any number and combination of the tiers 110-116 may be located in, for example, a remote cloud-like environment or in a local data location.

Figure 3:
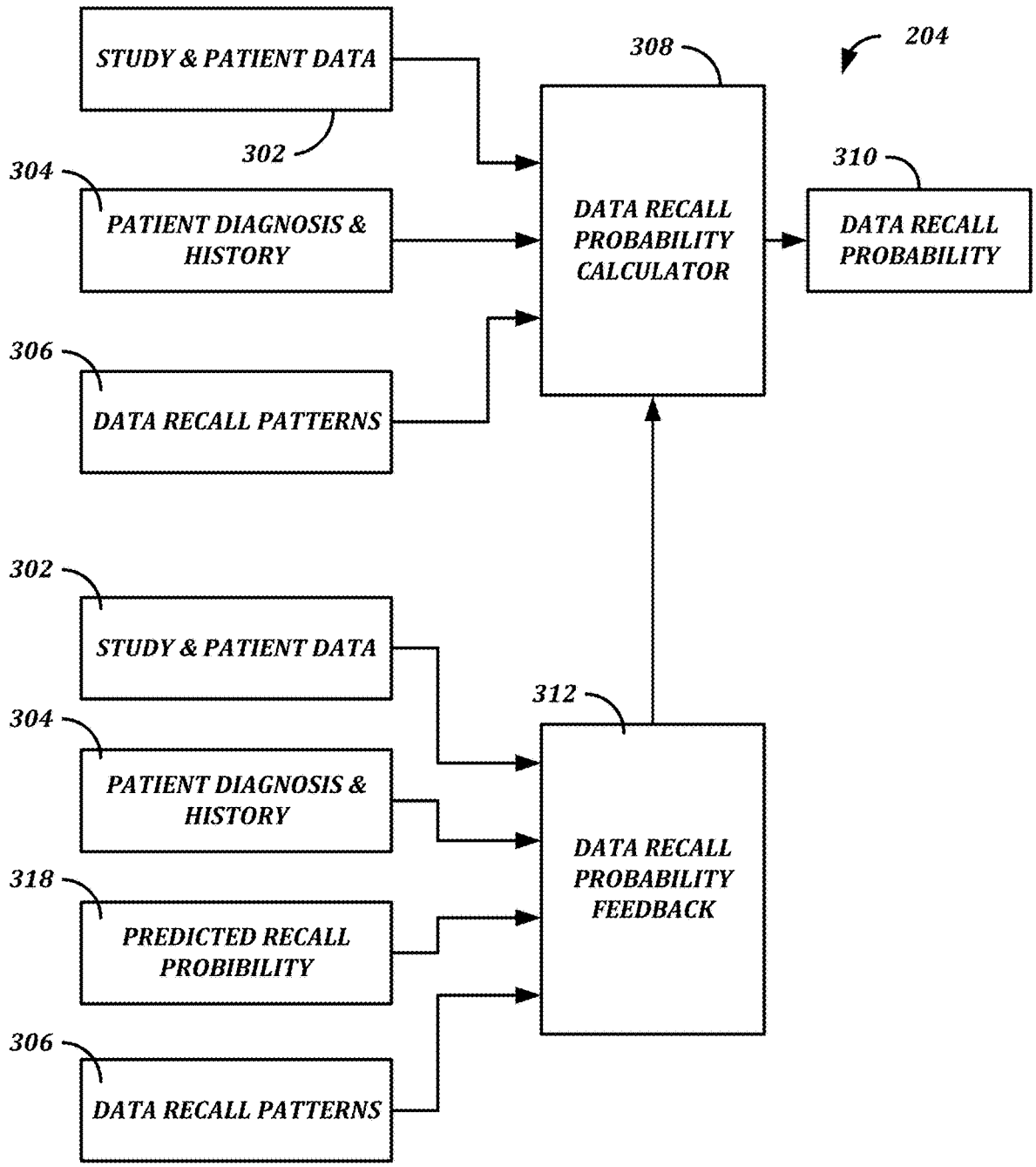
FIG. 3 illustrates an example of data flow in the system.

Referring now to FIG. 3. Embodiments of the present disclosure provide a hardware and software platform operative by a set of methods and computer-readable media comprising instructions configured to operate the various modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 900 may be employed in the performance of some or all of the stages disclosed with regard to the methods. Similarly, an apparatus may be employed in the performance of some or all of the stages of the methods. As such, the apparatus may comprise at least those architectural components as found in computing device 900.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 2:
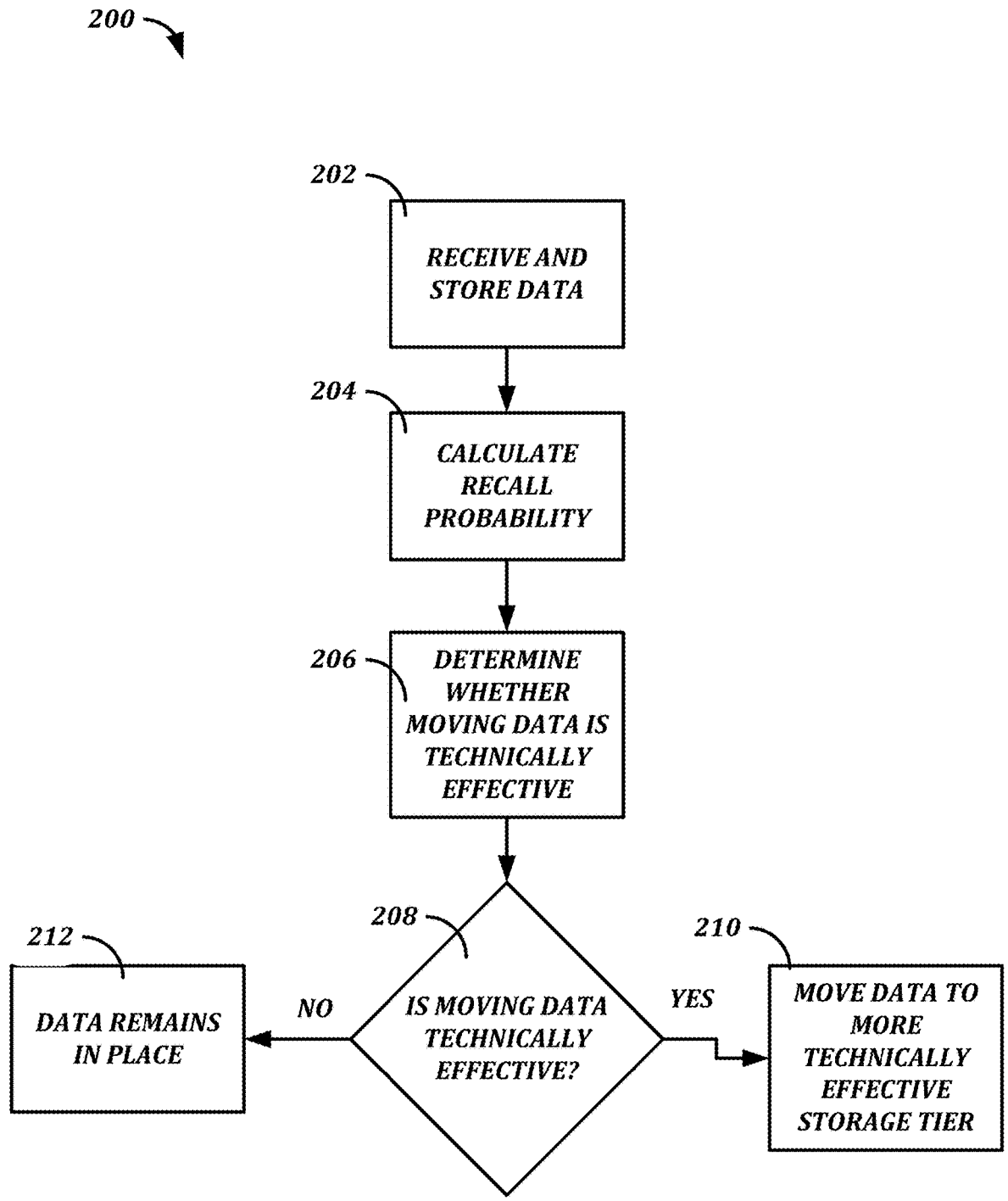
FIG. 2 illustrates a block diagram of an example method.

FIG. 2 illustrates a block diagram of an example method 200 of operating the system 100 (of FIG. 1). In this regard, in block 202, the system 100 is operative to receive data from a data source, and store the data in a tier of the tiered data storage 120. In block 204, the system 100 is operative to calculate a recall probability by determining how likely the received data will be retrieved or used within a particular time period.

This determination may use, for example, an algorithm using heuristics and machine learning to determine the likelihood that the data will be retrieved. For example, for a data system that services a hospital, the data may include images of a patient (a study) from a medical imaging device such as, for example a magnetic resonance imaging device. Such images may be associated with, for example, the name of the patient and unique identifier of the patient as well as any number of parameters such as, for example, the medical examination date of the patient, the type of examination, the name of the patient and identification number, and the patient's upcoming exam dates.

FIG. 3 illustrates an example of data flow in the system 100 that may be performed by the D ULM to generate a data recall probability for data in a medical image data example used for illustrative purposes only. Block 302 includes study and patient metadata such as, for example, the condition suffered by the patient or a date the images were generated. Block 304 includes patient diagnosis and history. For example, if a patient is diagnosed with heart disease, the diagnosis of heart disease and any relevant medical history of the patient may be associated with the patient and the images. Patient data may include, but not be limited to, patient encounter related data, patient scheduling data, patient event data (e.g., death), and various other data may be employed. Furthermore, such data may be shared across plurality of desperate networks for improved training of the machine learning models configured to calculate recall probability.

Block 306 includes data recall patterns that may include, for example, observations made about "other" data objects with similar characteristics. Furthermore, some embodiments, how often the data has been retrieved over a given time period may also be taken into account in the formulation of the recall probability.

The retrieval rates and times of a particular imaging study (i.e., data file) may factor on predicting the future recall of the imaging study. For example, if a patient is scheduled for an annual cancer screening, a recent recall may cause the system to reduce the recall probability of the imaging study to one year. Said another way, if a patient recently completed their annual cancer screening, and the patient was found to be cancer free, then the short-term recall probably of the patient's screening images may become quite low for the next then or so months.

Consistent with embodiments of the present disclosure, the system may be further operative to find patterns in other recalls that are similar or match the imaging study. For example, if the imaging study is for a cardiology study, the system may determine how often to retrieve other cardiology studies for similar patients or patients with similar conditions. It should be understood that this 'image study" in the context of the medical field is used for illustrative purposes, and that the various embodiments herein are not limited to any particular data or industry.

The system 100 processes the data or metadata in blocks 302-306 in block 308 where the system 100 generates a probability of data recall shown in block 310. FIG. 3 illustrates a feedback portion 312 that receives study and patient metadata 314, patient diagnosis and history data 316, predicted recall probability 318, and source recall patterns 320. The feedback portion 312 receives feedback data 314-320 and provides the feedback data to the data recall probability calculator 308 to improve the resultant data recall probability 310. The data inputs 302-306 and 314-320 are merely examples of the data and metadata that may be used by the system 100 to generate a data recall probability 310.

The data recall probability 310 may be computed on a regular time interval. The data recall probability 310 may be represented by, for example, a probability e.g., 0-1. In some embodiments, the system 100 may recall the probability of a particular data in each interval, and may change the data recall probability 310 based on changes in the metadata or other parameters (e.g., file generation date or file size). In other embodiments, recall probability may be kept current, consistently, without discrete intervals of calculation.

Returning back to FIG. 2, in block 206, the system 100 (of FIG. 1) determines whether moving the data is technically effective. The move-cost gate is a gate which, based on the resulting probability of recall, considering the actual cost and technical effect of moving the data from one tier to another, might prevent the move. This gate is influenced by the controller 406 (of FIG. 4A). The standard for making such technical effect evaluation may be based on, for example, the various technical advantages described herein.

In block 208 if moving the data is technically effective, The system 100 moves the data to a more cost effective storage tier in block 210. If moving the data is not cost effective in block 208, the data remains in place i.e., the data remains in the storage location (or tier) that the system 100 placed the data when the system 100 received the data in block 202.

Figure 4A:
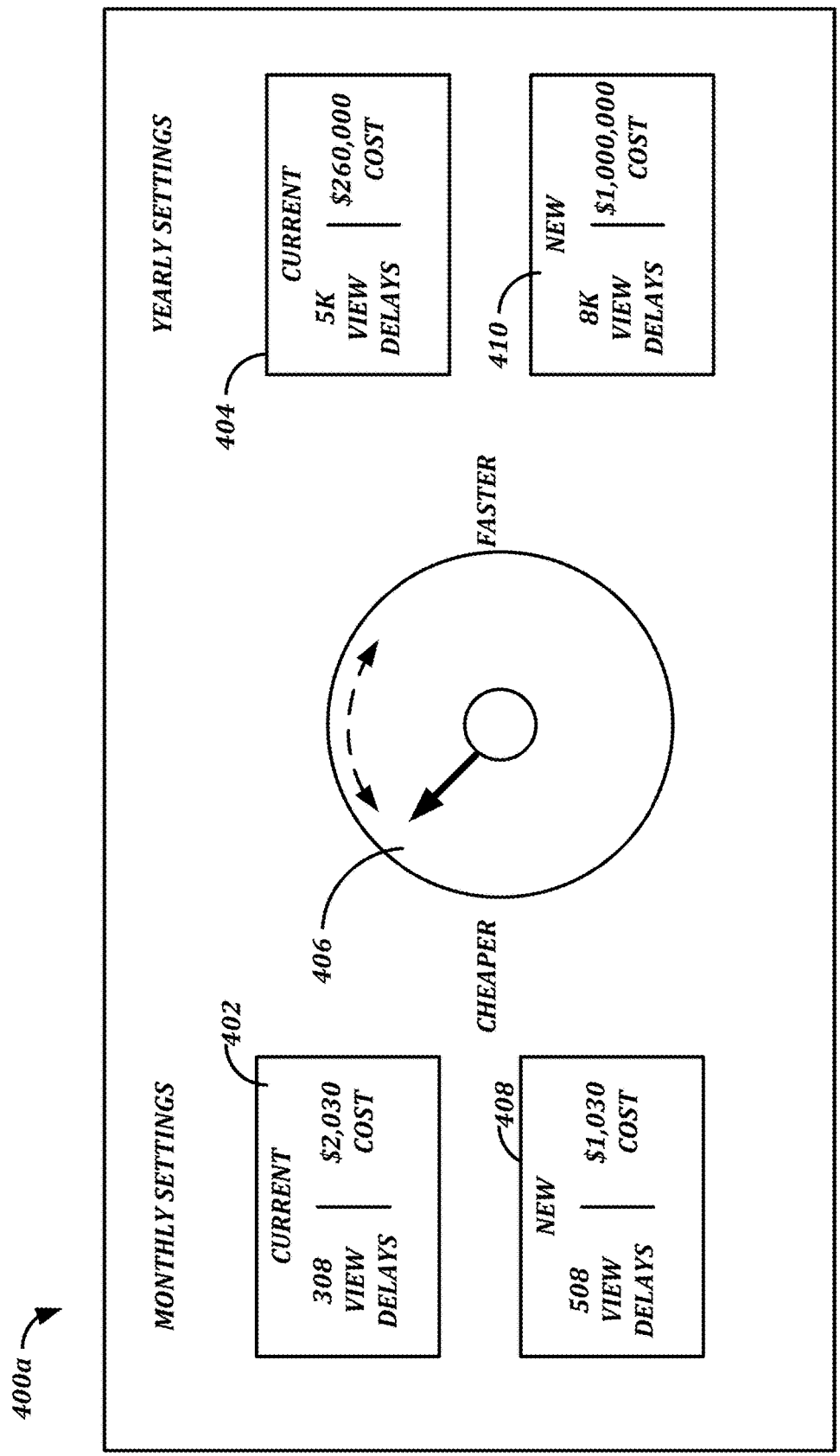
FIG. 4A illustrates a first example of a user interface of the system.

FIG. 4A illustrates one example embodiment of a user interface 400A of the system 100 that indicates the expected retrieval of data from particular data storage tiers. The dial may be configured to enable the user to specify a setting, or "control" setting, which may be used interchangeably with "user" setting herein. The control setting will be used as part of a determination of a threshold value for recall probability ranges to be placed into storage tiers. As apparent in FIG. 4A, if the setting is closer to "economical"—the threshold values would favor lowering the recall probability of the study so that it is placed into colder storage. For instance, if the setting is closer to "economical"—the threshold values for the cold storage will be increased, causing an object with a medium recall probability to be moved there. If closer to "fast"—the threshold values would raise the recall probability so that it is placed into hot storage. Examples of threshold variations are illustrated with reference to FIGS. 5-8. As will be described with reference to FIGS. 5-8, each storage tier may have a recall probability range for the data it contains (e.g., HOT tier—80-100, Warm tier—50-80, Cold tier—20-50, Frozen tier—<20. Such ranges can be configured separately by system administrators but will be transparent to the high-level end user.

When turning the dial 406, the user receives real-time feedback with respect to indicators that are affected by the cloud-retrieval storage speed. For example, the number of patients that can be consulted (patient volume), considering the cloud-retrieval speed is affecting the volume of patients. The projected revenue, based on the number of patients. Feedback may include, for example a current volume and revenue, based on current settings, and over imposed, the newly projected volume and revenue, with visual indicators.

The user interface 400A includes the current monthly settings indication 402 and current yearly settings indication 404. The indications 402 and 404 include a volume of patients that may be represented by a monetary amount and monetary revenue generated.

The interface 400A includes an example input portion 406, which in the illustrated example embodiment, includes a graphical representation of a dial that may be rotated by a user input in a faster (clockwise) direction to affect a faster setting or rotated in a counter clockwise direction to affect a less expensive (i.e., cheaper) setting.

In operation, when the user adjusts the setting towards cheaper or faster, the user adjusts a threshold value(s) for determining which storage tier to store data having a particular recall probability. The estimated resultant monthly and yearly outcomes are displayed in the new monthly and yearly settings indications portions 408 and 410. Thus, the user may view any predicted "new" outcomes by changing the input portion 406 prior to implementing the new monthly and yearly settings thereby, having an opportunity to easily compare settings prior to implementing the settings that may result in such outcomes. Though the illustrated embodiment includes an example input portion 406 that depicts a rotatable dial, any suitable user input method may be used to adjust the monthly and yearly settings. Such an arrangement allows a user to change the settings for the system 100 with respect to the performance versus the cost of the change in settings (i.e., a cost benefit analysis).

The system 100 may also provide feedback to the user by quantifying and displaying, for example, an amount of data that will incur longer user wait times for retrieving, which reduces the performance of the system 100 and an amount of data located in a more costly storage tier that has remained unused (not retrieved) thereby increasing the cost of storage for the system 100. Such information allows an administrator in some embodiments to use a single input to balance the cost benefit of changing the data recall performance of the system. This allows administrators to provide users with a system that performs better while being conscious of the costs of operating the system.

Figure 4B:
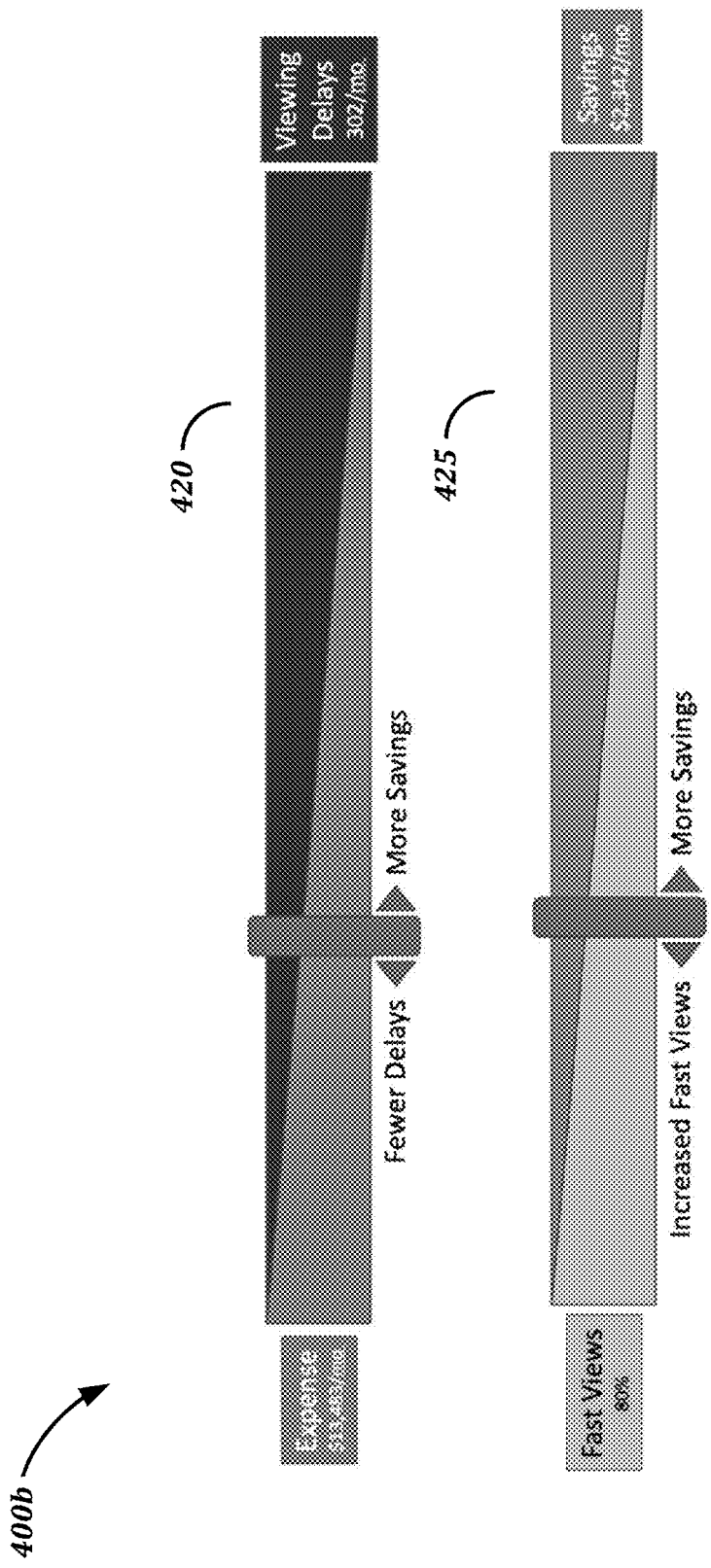
FIG. 4B illustrates a second example of a user interface of the system.
Figure 4C:
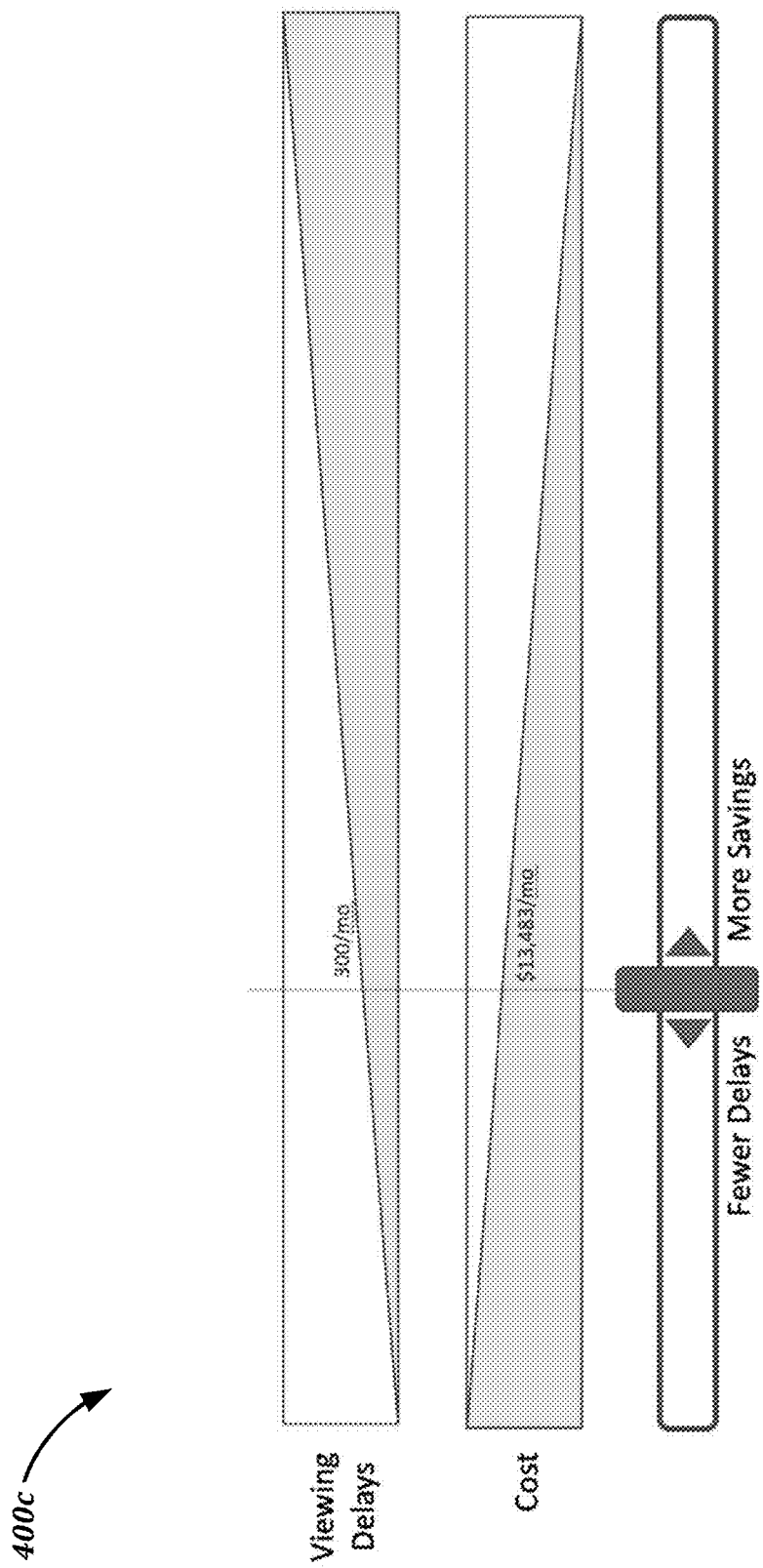
FIG. 4C illustrates third example of a user interface of the system.

FIG. 4B illustrates one example embodiment of a user interface 400B of the system. In this example, a dial may be embodied as a slide. In a first variation 420, the slider may alternate between expense and viewing delays. In a second variation 425, the slider may alternative between fast loading times and increased savings. It is important to consider that the labels and values projected in these slider ends are projections of the same underlying concepts, but presented with a different metric of interest. FIG. 4C illustrates yet another example embodiment of a user interface 400c of the system. Accordingly, in some embodiments, the user may be enabled to select from a plurality of competing metrics they wish to 'slide' or 'dial' between. In such scenarios, a plurality of sliders may be provided for the plurality of competing metrics. The system may be configured to, in turn, define the same threshold values to determine storage tiers based on recall probabilities.

In yet further embodiments, multiple controls may have different settings for different types of data (e.g., imaging studies for radiology vs. cardiology, or oncology, or mammography, etc.) or, in some embodiments, for different types of patients, different physicians, or different organizations or departments. Further still, controls may be fully automatic—that is, not requiring user settings or adjustments. Rather, the system may be pre-configured with a quality of service, e.g., as the average number of slow recalls per day/week/month. From there, an HSM would optimize storage costs.

Figure 5:
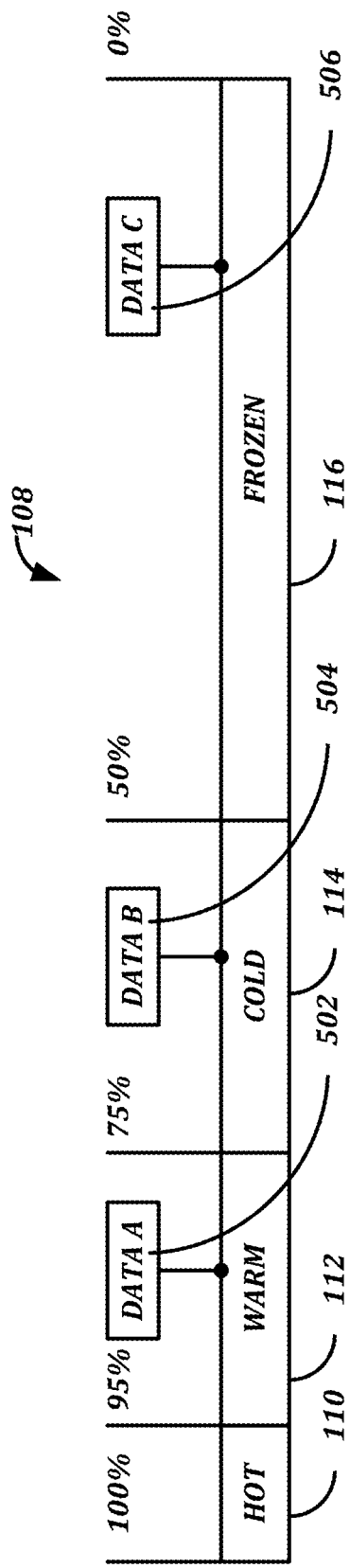
FIG. 5 illustrates a representation of a tiered storage system.

FIG. 5 illustrates a representation of a tiered storage system 120 that includes the hot tier 110, the warm tier 112, the cold tier 114, and the frozen tier 116. Data A 502 has a relatively high recall probability and is stored in the warm tier 112. The data B 504 has a lower recall probability with respect to the data A 502, and is stored in the cold tier 114. Data C has a relatively lower recall probability with respect to data B 504, and is stored in the frozen tier 116.

Figure 6:
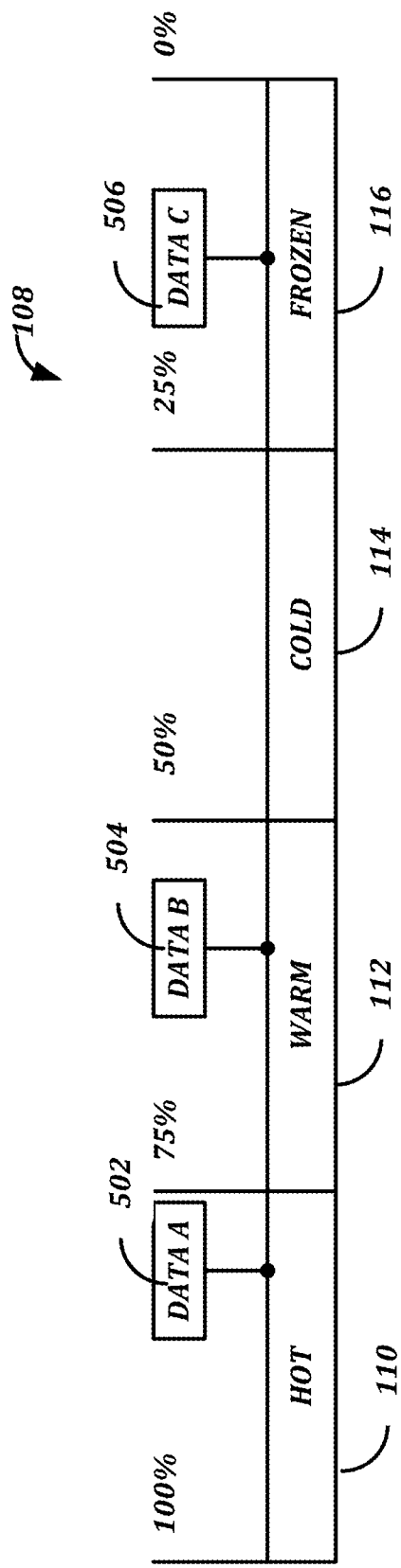
FIG. 6 illustrates another representation of a tiered storage system.

FIG. 6 illustrates an example of the tiered storage system 120 following a change in the threshold settings that may be adjusted by using the input portion 406 (of FIG. 4A) is intended to reduce the amount of data stored in the frozen tier 116, which would probably increase the cost of using the tiered storage system 120, but increase the performance of the tiered storage system 120 by reducing data retrieval times for some of the data. In FIG. 6, the recall probability of the data 502, 504, and 506 remains (substantially) constant. However, with the adjustment of the settings described above, data A 502 has been moved from the warm tier 112 to the hot tier 110. The data B 504 has been moved from the cold tier 114 to the warm tier 112. The data C 506 remains in the frozen tier 116.

Figure 7:
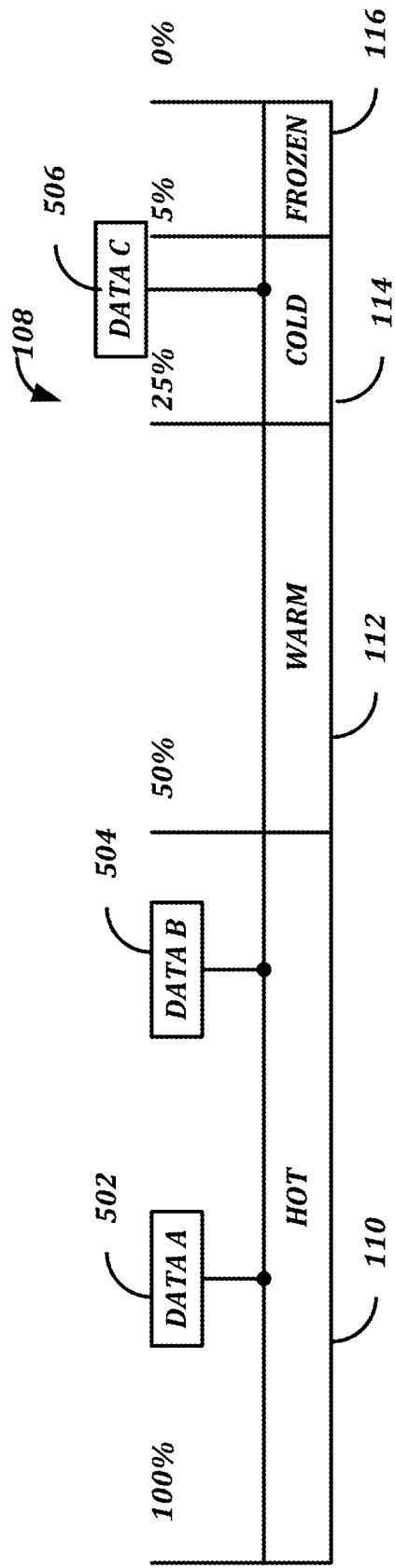
FIG. 7 illustrates another representation of a tiered storage system.

FIG. 7 illustrates another example of the tiered storage system 120 following another change in the system threshold settings by adjusting the input portion 406 (of FIG. 4A). In this regard, the data A 502 remains in the hot tier 110. The data B 504 has been moved from the warm tier 112 to the hot tier 110. The data C 506 has been moved from the frozen tier 116 to the cold tier 114.

The FIGS. 5-7 illustrate an example of operation of the system 100 (of FIG. 1) where the settings change the amount of data stored in particular tiers as a function of the control adjusting the thresholds between tiers. The thresholds are used to determine in which storage tier data having a particular recall probability should be stored. The thresholds may be adjusted or changed by, for example, operating the input portion 406 (of FIG. 4A).

The FIGS. 5-7 illustrate how the data may be moved between storage tiers when the recall probabilities of the data A-C 502-506 remain (substantially) constant. However, the system 100 may periodically recalculate the recall probability of data based on a number of factors such as, for example, a patient has scheduled an appointment or a particular diagnosis of a patient.

Figure 8:
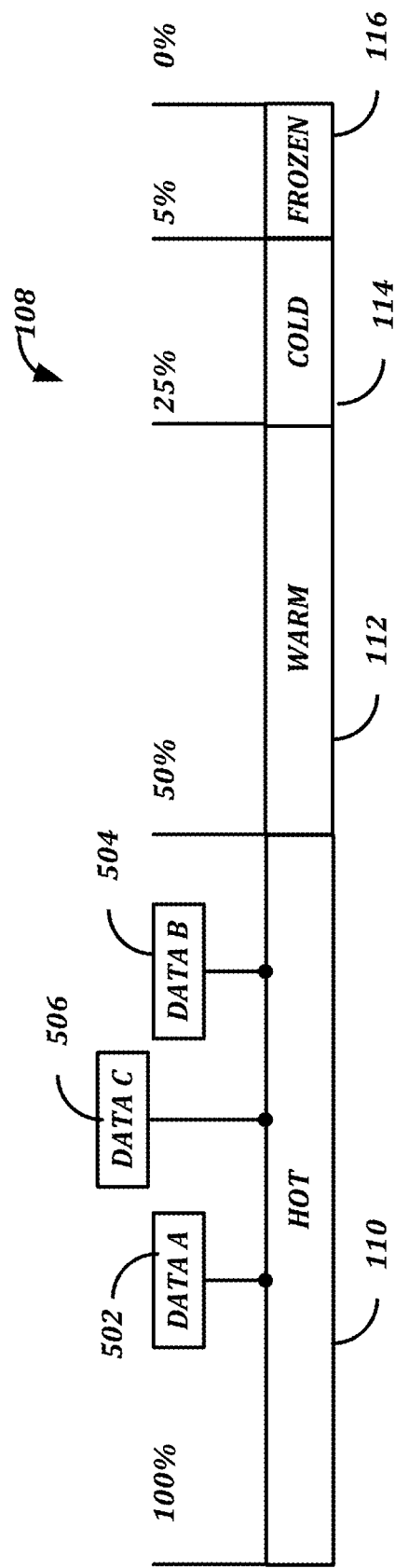
FIG. 8 illustrates another representation of a tiered storage system.

In this regard, FIG. 8 illustrates the movement of data C 506 from the cold tier 114 to the hot tier 110. Such a move is made after recalculating the recall probability of the data C 506 and moving the data C 506 to the hot tier 110 that corresponds to the recalculated recall probability of the data C 506.

In some embodiments, a data recall probability agent periodically runs or may run when triggered by events such as, for example, patient scheduling that may trigger moving certain data between tiers. The DULM calculates, updates, or generates a recall probability for data stored in the various data storage tiers. The data recall probability agent assigns a recall probability for each file or object. The file or object may be moved to another tier following the update of the recall probability depending on the location of the thresholds.

For example, the data recall probability agent may periodically run on a schedule or after a defined event. For each data file, compute the data recall probability and run the data through a move-cost gate. If the data clears, move the data to a tier corresponding on the resulted data recall probability.

The example methods and systems described above offer a way to economically improve the performance of the system 100 by storing data in particular data tiers based, in part, on the probability of the data being requested in a given time period. Data having a higher probability of being retrieved contemporaneously may be stored in a tier offering faster data retrieval at a higher cost while data having a lower probability of being requested in a given time period may be stored in a tier offering less expensive, but slower data retrieval times.

The example methods and systems offer a user an interface that allows the user to change the thresholds for determining which storage tier the system 100 will use to store data having a particular recall probability.

Figure 9:
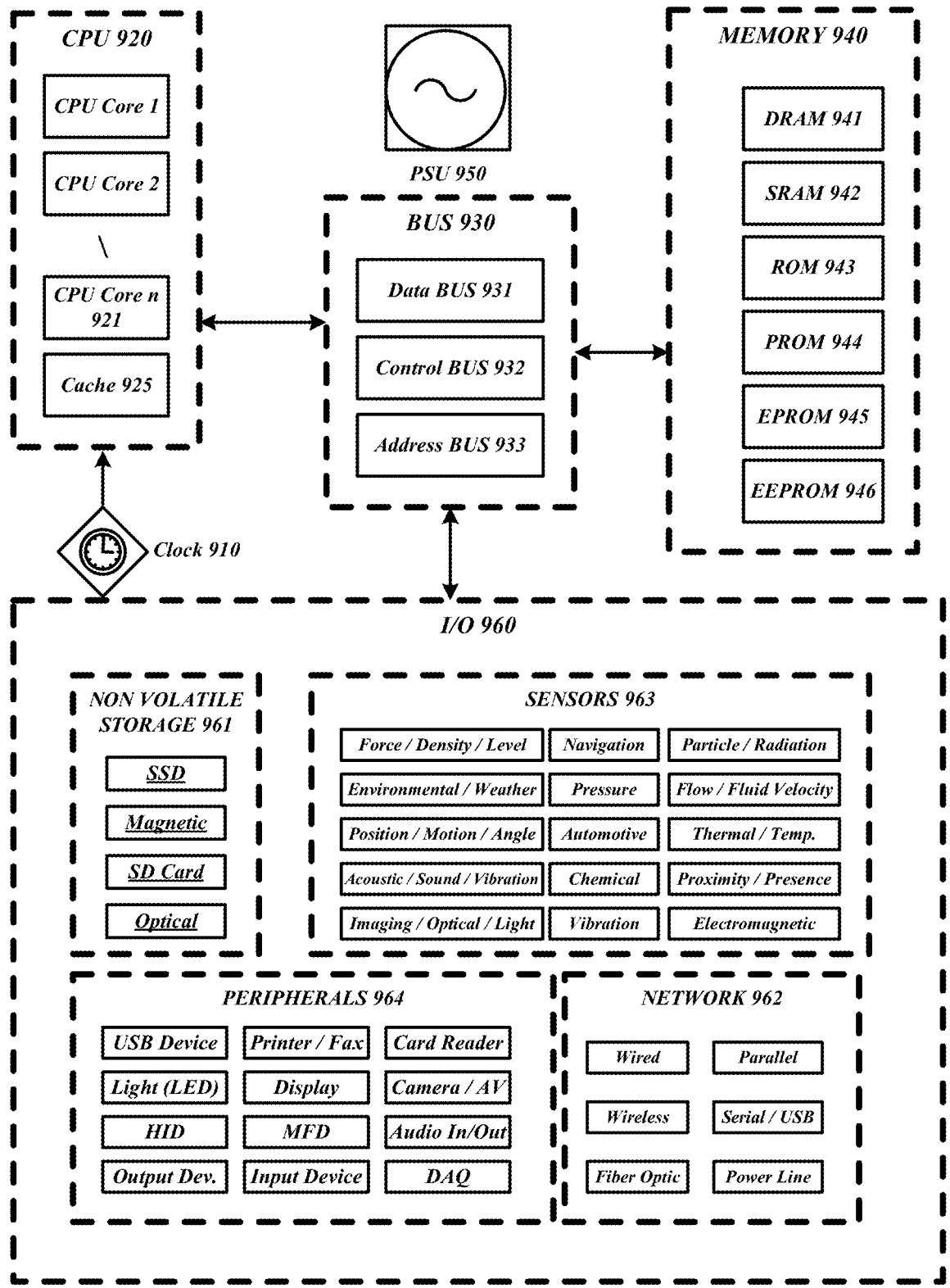
FIG. 9 illustrates an example of a portion of a computer system.

FIG. 9 is a block diagram of a system including computing device 900. Portions of the system 100 may be embodied as, for example, but not be limited to, a website, a web application, a desktop application, backend application, and a mobile application compatible with a computing device 900. The computing device 900 may comprise, but not be limited to, the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series; and A microcomputer, wherein the microcomputer computing device comprises, but is not limited to, a server, wherein a server may be rack mounted, a workstation, an industrial device, a raspberry pie, a desktop, or an embedded device.

Platform 100 may be hosted on a centralized server or a cloud computing service. Although the methods have been described to be performed by a computing device 900, it should be understood that, in some embodiments, different operations may be performed by a plurality of the computing devices 900 in operative communication at least one network.

Embodiments of the present disclosure may comprise a system having a central processing unit (CPU) 920, a bus 930, a memory unit 940, a power supply unit (PSU) 950, and one or more Input/Output (I/O) units. The CPU 920 coupled to the memory unit 940 and the plurality of I/O units 960 via the bus 930, all of which are powered by the PSU 950. It should be understood that, in some embodiments, each disclosed unit may actually be a plurality of such units for the purposes of redundancy, high availability, and/or performance. The combination of the presently disclosed units is configured to perform the stages any method disclosed herein.

Consistent with an embodiment of the disclosure, the aforementioned CPU 920, the bus 930, the memory unit 940, a PSU 950, and the plurality of I/O units 960 may be implemented in a computing device, such as computing device 900 of FIG. 9. Any suitable combination of hardware, software, or firmware may be used to implement the aforementioned units. For example, the CPU 920, the bus 930, and the memory unit 940 may be implemented with computing device 900 or any of other computing devices 900, in combination with computing device 900. The aforementioned system, device, and components are examples and other systems, devices, and components may comprise the aforementioned CPU 920, the bus 930, the memory unit 940, consistent with embodiments of the disclosure.

At least one computing device 900 may be embodied as any of the computing elements illustrated in all of the attached figures. A computing device 900 does not need to be electronic, nor even have a CPU 920, nor bus 930, nor memory unit 940. The definition of the computing device 900 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 900, especially if the processing is purposeful.

With reference to FIG. 9, a system consistent with an embodiment of the disclosure may include a computing device, such as computing device 900. In a basic configuration, computing device 900 may include at least one clock module 910, at least one CPU 920, at least one bus 930, and at least one memory unit 940, at least one PSU 950, and at least one I/O 960 module, wherein I/O module may be comprised of, but not limited to, a non-volatile storage sub-module 961, a communication sub-module 962, a sensors sub-module 963, and a peripherals sub-module 964.

A system consistent with an embodiment of the disclosure the computing device 900 may include the clock module 910 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 920, the central component of modern computers, which relies on a clock. The exceptions are asynchronous circuits such as asynchronous CPUs. The clock 910 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 900 use a "clock multiplier" which multiplies a lower frequency external clock to the appropriate clock rate of the CPU 920. This allows the CPU 920 to operate at a much higher frequency than the rest of the computer, which affords performance gains in situations where the CPU 920 does not need to wait on an external factor (like memory 940 or input/output 960). Some embodiments of the clock 910 may include dynamic frequency change, where the time between clock edges can vary widely from one edge to the next and back again.

A system consistent with an embodiment of the disclosure the computing device 900 may include the CPU unit 920 comprising at least one CPU Core 921. A plurality of CPU cores 921 may comprise identical the CPU cores 921, such as, but not limited to, homogeneous multi-core systems. It is also possible for the plurality of CPU cores 921 to comprise different the CPU cores 921, such as, but not limited to, heterogeneous multi-core systems, big.LITTLE systems and some AMD accelerated processing units (APU). The CPU unit 920 reads and executes program instructions which may be used across many application domains, for example, but not limited to, general purpose computing, embedded computing, network computing, digital signal processing (DSP), and graphics processing (GPU). The CPU unit 920 may run multiple instructions on separate CPU cores 921 at the same time. The CPU unit 920 may be integrated into at least one of a single integrated circuit die and multiple dies in a single chip package. The single integrated circuit die and multiple dies in a single chip package may contain a plurality of other aspects of the computing device 900, for example, but not limited to, the clock 910, the CPU 920, the bus 930, the memory 940, and I/O 960.

The CPU unit 920 may contain cache 922 such as, but not limited to, a level 1 cache, level 2 cache, level 3 cache or combination thereof. The aforementioned cache 922 may or may not be shared amongst a plurality of CPU cores 921. The cache 922 sharing comprises at least one of message passing and inter-core communication methods may be used for the at least one CPU Core 921 to communicate with the cache 922. The inter-core communication methods may comprise, but not limited to, bus, ring, two-dimensional mesh, and crossbar. The aforementioned CPU unit 920 may employ symmetric multiprocessing (SMP) design.

The plurality of the aforementioned CPU cores 921 may comprise soft microprocessor cores on a single field programmable gate array (FPGA), such as semiconductor intellectual property cores (IP Core). The plurality of CPU cores 921 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 921, for example, but not limited to, Instruction-level parallelism (ILP) such as, but not limited to, superscalar pipelining, and Thread-level parallelism (TLP).

Consistent with the embodiments of the present disclosure, the aforementioned computing device 900 may employ a communication system that transfers data between components inside the aforementioned computing device 900, and/or the plurality of computing devices 900. The aforementioned communication system will be known to a person having ordinary skill in the art as a bus 930. The bus 930 may embody internal and/or external plurality of hardware and software components, for example, but not limited to, a wire, optical fiber, communication protocols, and any physical arrangement that provides the same logical function as a parallel electrical bus. The bus 930 may comprise at least one of, but not limited to, a parallel bus, wherein the parallel bus carry data words in parallel on multiple wires, and a serial bus, wherein the serial bus carry data in bit-serial form. The bus 930 may embody a plurality of topologies, for example, but not limited to, a multidrop/electrical parallel topology, a daisy chain topology, and a connected by switched hubs, such as USB bus. The bus 930 may comprise a plurality of embodiments, for example, but not limited to:

Internal data bus (data bus) 931/Memory bus
Control bus 932
Address bus 933
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (i.e., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to, Extended ISA (EISA), PC/XT-bus/PC/AT-bus/PC/104 bus (e.g., PC/104-Plus, PCI/104-Express, PCI/104, and PCI-104), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 294 Interface/Firewire, Thunderbolt, and eXtensible Host Controller Interface (xHCI).

Consistent with the embodiments of the present disclosure, the aforementioned computing device 900 may employ hardware integrated circuits that store information for immediate use in the computing device 900, know to the person having ordinary skill in the art as primary storage or memory 940. The memory 940 operates at high speed, distinguishing it from the non-volatile storage sub-module 961, which may be referred to as secondary or tertiary storage, which provides slow-to-access information but offers higher capacities at lower cost. The contents contained in memory 940, may be transferred to secondary storage via techniques such as, but not limited to, virtual memory and swap. The memory 940 may be associated with addressable semiconductor memory, such as integrated circuits consisting of silicon-based transistors, used for example as primary storage but also other purposes in the computing device 900. The memory 940 may comprise a plurality of embodiments, such as, but not limited to, volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 941, Static Random-Access Memory (SRAM) 942, CPU Cache memory 925, Advanced Random-Access Memory (A-RAM), and other types of primary storage such as Random-Access Memory (RAM).

Non-volatile memory which can retain stored information even after power is removed, for example, but not limited to, Read-Only Memory (ROM) 943, Programmable ROM (PROM) 944, Erasable PROM (EPROM) 945, Electrically Erasable PROM (EEPROM) 946 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to, spin-transfer torque RAM (STT-RAM).

Consistent with the embodiments of the present disclosure, the aforementioned computing device 900 may employ the communication system between an information processing system, such as the computing device 900, and the outside world, for example, but not limited to, human, environment, and another computing device 900. The aforementioned communication system will be known to a person having ordinary skill in the art as I/O 960. The I/O module 960 regulates a plurality of inputs and outputs with regard to the computing device 900, wherein the inputs are a plurality of signals and data received by the computing device 900, and the outputs are the plurality of signals and data sent from the computing device 900. The I/O module 960 interfaces a plurality of hardware, such as, but not limited to, non-volatile storage 961, communication devices 962, sensors 963, and peripherals 964. The plurality of hardware is used by the at least one of, but not limited to, human, environment, and another computing device 900 to communicate with the present computing device 900. The I/O module 960 may comprise a plurality of forms, for example, but not limited to, channel I/O, port mapped I/O, asynchronous I/O, and Direct Memory Access (DMA).

Consistent with the embodiments of the present disclosure, the aforementioned computing device 900 may employ the non-volatile storage sub-module 961, which may be referred to by a person having ordinary skill in the art as one of secondary storage, external memory, tertiary storage, off-line storage, and auxiliary storage. The non-volatile storage sub-module 961 may not be accessed directly by the CPU 920 without using intermediate area in the memory 940. The non-volatile storage sub-module 961 does not lose data when power is removed and may be two orders of magnitude less costly than storage used in memory module, at the expense of speed and latency. The non-volatile storage sub-module 961 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (961) may comprise a plurality of embodiments, such as, but not limited to:

- Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).
- Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.
- Magnetic storage such as, but not limited to, Hard Disk Drive (HDD), tape drive, carousel memory, and Card Random-Access Memory (CRAM).
- Phase-change memory
- Holographic data storage such as Holographic Versatile Disk (HVD).
- Molecular Memory
- Deoxyribonucleic Acid (DNA) digital data storage Consistent with the embodiments of the present disclosure, the aforementioned computing device 900 may employ the communication sub-module 962 as a subset of the I/O 960, which may be referred to by a person having ordinary skill in the art as at least one of, but not limited to, computer network, data network, and network. The network allows computing devices 900 to exchange data using connections, which may be known to a person having ordinary skill in the art as data links, between network nodes. The nodes comprise network computer devices 900 that originate, route, and terminate data. The nodes are identified by network addresses and can include a plurality of hosts consistent with the embodiments of a computing device 900. The aforementioned embodiments include, but not limited to, personal computers, phones, servers, drones, and networking devices such as, but not limited to, hubs, switches, routers, modems, and firewalls.

Two nodes can be said are networked together, when one computing device 900 is able to exchange information with the other computing device 900, whether or not they have a direct connection with each other. The communication sub-module 962 supports a plurality of applications and services, such as, but not limited to, World Wide Web (WWW), digital video and audio, shared use of application and storage computing devices 900, printers/scanners/fax machines, email/online chat/instant messaging, remote control, distributed computing, etc. The network may comprise a plurality of transmission mediums, such as, but not limited to, conductive wire, fiber optics, and wireless. The network may comprise a plurality of communications protocols to organize network traffic, wherein application-specific communications protocols are tiered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 962 may comprise a plurality of size, topology, traffic control mechanism and organizational intent. The communication sub-module 962 may comprise a plurality of embodiments, such as, but not limited to:

- Wired communications, such as, but not limited to, coaxial cable, phone lines, twisted pair cables (ethernet), and InfiniBand.
- Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G,4G (such as WiMax and LTE), and 5G (short and long wavelength).
- Parallel communications, such as, but not limited to, LPT ports.
- Serial communications, such as, but not limited to, RS-232 and USB.
- Fiber Optic communications, such as, but not limited to, Single-mode optical fiber (SMF) and Multi-mode optical fiber (MMF).
- Power Line communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to, nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 900 may employ the sensors sub-module 963 as a subset of the I/O 960. The sensors sub-module 963 comprises at least one of the devices, modules, and subsystems whose purpose is to detect events or changes in its environment and send the information to the computing device 900. Sensors are sensitive to the measured property, are not sensitive to any property not measured, but may be encountered in its application, and do not significantly influence the measured property. The sensors sub-module 963 may comprise a plurality of digital devices and analog devices, wherein if an analog device is used, an Analog to Digital (A-to-D) converter must be employed to interface the said device with the computing device 900. The sensors may be subject to a plurality of deviations that limit sensor accuracy. The sensors sub-module 963 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 900 may employ the peripherals sub-module 962 as a subset of the I/O 960. The peripheral sub-module 964 comprises ancillary devices uses to put information into and get information out of the computing device 900. There are three categories of devices comprising the peripheral sub-module 964, which exist based on their relationship with the computing device 900, input devices, output devices, and input/output devices.

Input devices send at least one of data and instructions to the computing device 900. Input devices can be categorized based on, but not limited to:

- Modality of input, such as, but not limited to, mechanical motion, audio, visual, and tactile.
- Whether the input is discrete, such as but not limited to, pressing a key, or continuous such as, but not limited to, position of a mouse.
- The number of degrees of freedom involved, such as, but not limited to, two-dimensional mice vs three-dimensional mice used for Computer-Aided Design (CAD) applications.

Output devices may provide output from the computing device 900. Output devices may convert electronically generated information into a form that can be presented to humans. Input/output devices may perform both input and output functions. It would be understood by a person having ordinary skill in the art that the ensuing are non-limiting embodiments of the aforementioned peripheral sub-module 964:

Input Devices:
- Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).
- High degree of freedom devices, that require up to six degrees of freedom such as, but not limited to, camera gimbals, Cave Automatic Virtual Environment (CAVE), and virtual reality systems.
- Video Input devices are used to digitize images or video from the outside world into the computing device 900. The information can be stored in a multitude of formats depending on the user's requirement. Examples of types of video input devices include, but not limited to, digital camera, digital camcorder, portable media tier, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.
- Audio input devices are used to capture sound. In some cases, an audio output device can be used as an input device, in order to capture produced sound. Audio input devices allow a user to send audio signals to the computing device 900 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to, microphone, Musical Instrument Digital Interface (MIDI) devices such as, but not limited to, a keyboard, and headset.
- Data AcQuisition (DAQ) devices covert at least one of analog signals and physical parameters to digital values for processing by the computing device 900. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:
- Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).
- Printers, such as, but not limited to, inkjet printers, laser printers, 3D printers, solid ink printers and plotters.
- Audio and Video (AV) devices, such as, but not limited to, speakers, headphones, amplifiers and lights, which include lamps, strobes, DJ lighting, stage lighting, architectural lighting, special effect lighting, and lasers.
- Other devices such as Digital to Analog Converter (DAC).

Input/Output Devices may further comprise, but not be limited to, touchscreens, networking device (e.g., devices disclosed in network 962 sub-module), data storage device (non-volatile storage 961), facsimile (FAX), and graphics/sound cards.

All rights including copyrights in the code included herein are vested in and the property of the Applicant. The Applicant retains and reserves all rights in the code included herein, and grants permission to reproduce the material in connection with reproduction of the granted patent and for no other purpose.

ASPECTS

The following disclose various Aspects of the present disclosure. The various Aspects are not to be construed as patent claims unless the language of the Aspect appears as a patent claim. The Aspects describe various non-limiting embodiments of the present disclosure.

A system for storing data, the system comprising:
a. a processor operative to manage the storing of data by determining a likelihood of data access of a data file;
b. a display communicatively connected to the processor; and
c. an input device communicatively connected to the processor.

The system of aspect 1, wherein the processor is operative to receive the data file prior to determining a likelihood of data access of the data file.

The system of aspect 1, wherein the processor is further operative to:
a. generate a recall probability as a function of determining the likelihood of data access of the data file; and
b. associate the recall probability with the data file.

The system of aspect 1, wherein the processor is further operative to store the data file in a storage location corresponding to a recall probability.

The system of aspect 1, wherein the processor is further operative to store data in a file storage location partially defined by recall probability thresholds.

The system of aspect 1, wherein the processor is operative to determine a likelihood of data access as a function of an appointment date associated with a patient associated with the data file.

The system of aspect 1, wherein the processor is operative to determine a likelihood of data access as a function of an appointment type associated with a patient associated with the data file.

The system of aspect 1, wherein the processor is operative to determine a likelihood of data access as a function of a procedure description associated with a patient associated with the data file.

The system of aspect 1, further comprising a data storage device communicatively connected to the processor the data storage device operative to receive and store the data file in a file location corresponding to the recall probability of the data file.

The system of aspect 1, wherein the processor is operative to display to a user on the display a user interface that includes a user input that receives a first input from a user, the faster input operative to increase a recall speed of data in the system.

The system of aspect 1, wherein the processor is operative to display to a user on the display, a user interface that includes a user input that receives a second input from the user, the second input operative to decrease the cost of operating the system.

The system of aspect 1, wherein the processor is operative to display to a user on the display a user interface that includes a current storage cost.

The system of aspect 1, wherein the processor is operative to display to a user on the display a user interface that includes a projected storage cost responsive to receiving an input from a user.

The system of aspect 1, wherein the processor is operative to display to a user on the display a user interface that includes a cost and volume of the storage usage for the system over a time period.

The system of aspect 1, wherein the processor is operative to display to a user on the display a user interface that includes a user input dial that is operative to receive a first user input and a second user input from the user.

The system of aspect 1, wherein an input from the user is operative to change location thresholds associated with portions of a storage device.

The system of aspect 1, wherein the user input includes a graphical representation of a rotatable dial that is operative to change a parameter of the system.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system comprising:
    a hierarchical data storage architecture,
        wherein the hierarchical data storage architecture comprises the following storage tiers:
            a first tier associated with a first range of recall probability scores, and a second tier associated with a second range of recall probability scores;
    at least one computing agent,
        wherein the at least one computing agent is configured to:
            compute a recall probability score for a data element stored in the hierarchical data storage architecture, and
            affect a transfer of the data element based on, at least in part, the recall probability score,
                wherein the transfer of the data element is between the following:
                    the first tier, and
                    the second tier; and
    a graphical user interface (GUI),
        wherein the GUI comprises at least one functional GUI element configured to:
            enable an end-user to specify a desired balance between the following elements:
                speed of data retrieval, and
                cost of data storage.

2. The system of claim 1, wherein the at least one computing agent is further configured to:
    determine whether to transfer the data element based on a comparison of the recall probability score associated with the data element to the first range of recall probability scores and the second range of recall probability scores.

3. The system of claim 2, wherein the at least one computing agent is further configured to:
    receive the desired balance as specified through the GUI, and
    adjust at least one of the following:
        the first range of recall probability scores, and
        the second range of recall probability scores.

4. The system of claim 3, wherein the at least one computing agent is further configured to:
    effect a subsequent transfer of the data element based on, at least in part, the recall probability score,
        wherein the transfer of the data element is further based on at least one of the following:
            the adjusted first range of recall probability scores, and
            the adjusted second range of recall probability scores.

5. The system of claim 1, wherein the at least one computing agent being configured to compute the recall probability score for the data element comprises the at least one computing agent being configured to assess at least one of the following:
    aspects intrinsic to the data element, and
    aspects extrinsic to the data element.

6. The system of claim 5, wherein the aspects intrinsic to the data element comprise at least one of the following: a study date, a study type, and patient related data.

7. The system of claim 5, wherein the aspects extrinsic to the data element comprise at least one of the following: patient disease, patient's schedule, practice area data, and facility related data.

8. The system of claim 1, wherein the at least one computing agent is further configured to continuously update a computation of the recall probability score based on, at least in part, at least one change in at least one of the following:
    aspects intrinsic to the data element, and
    aspects extrinsic to the data element.

9. The system of claim 1, wherein the at least one functional GUI element comprises a dial interface.

10. The system of claim 1, wherein the at least one functional GUI element comprises a slider interface.

11. A method comprising:
- associating a first range of recall probability scores with a first storage tier in a hierarchical data storage architecture;
- associating a second range of recall probability scores with a second storage tier in the hierarchical data storage architecture;
- receiving data;
- calculating a recall probability score associated with the received data;
- storing the data in the first storage tier in the hierarchical data storage architecture;
- receiving a specification of a desired balance between at least the following elements:
  - speed of data retrieval, and
  - cost of data storage;
- determining whether moving the data from the first storage to a second storage tier meets the desired balance; and
- moving the data to the second storage tier responsive to determining that moving the data from the first storage tier to the second storage tier is cost effective.

12. The method of claim 11, wherein the recall probability score associated with the stored data is a function of at least the following:
- an intrinsic parameter associated with the stored data, and
- an extrinsic parameter associated with the stored data.

13. The method of claim 11, wherein determining whether moving the data from the first storage tier to a second storage tier is cost effective includes comparing the recall probability score with a threshold associated with the second storage tier.

14. The method of claim 11, wherein determining whether moving the data from the first storage tier to a second storage tier is cost effective includes comparing the recall probability score with a threshold associated with the first storage tier.

15. The method of claim 11, wherein the recall probability score represents a probability that the data will be retrieved by a user during a time period.

16. The method of claim 11, further comprising:
- receiving a user input to modify a threshold associated with the first storage tier;
- determining whether the recall probability score associated with the data exceeds a threshold associated with the first data storage tier; and
- moving the data to the second storage tier responsive to determining that the recall probability score associated with the data exceeds the threshold associated with the first storage tier.

17. The method of claim 11, further comprising presenting information to a user that is indicative of a data retrieval rate of data stored in the first storage tier.

18. The method of claim 11, further comprising presenting information to a user that is indicative of an amount of data stored in the first storage tier that has not been retrieved by a user during a threshold time period.

* * * * *